(12) United States Patent
Carson

(10) Patent No.: US 7,429,048 B1
(45) Date of Patent: Sep. 30, 2008

(54) PISTON RING WITH PROJECTION

(75) Inventor: Michael E. Carson, Muskegon, MI (US)

(73) Assignee: Mahle Engine Components USA, Inc., Muskegon, MI (US)

( * ) Notice: Subject to any disclaimer, the term of this patent is extended or adjusted under 35 U.S.C. 154(b) by 113 days.

(21) Appl. No.: 10/707,099

(22) Filed: Nov. 20, 2003

(51) Int. Cl.
*F16J 9/00* (2006.01)

(52) U.S. Cl. .................. 277/460; 277/459; 277/434

(58) Field of Classification Search ............. 277/309, 277/310, 434, 436, 451, 452, 453, 459, 460, 277/494
See application file for complete search history.

(56) References Cited

U.S. PATENT DOCUMENTS

| | | | |
|---|---|---|---|
| 360,121 A | | 3/1887 | St. John |
| RE14,969 E | * | 10/1920 | Norwood ............... 277/451 |
| 1,404,540 A | * | 1/1922 | Norwood ............... 277/460 |
| 1,435,592 A | | 11/1922 | Doan et al. |
| 1,471,700 A | * | 10/1923 | Moore .................. 277/460 |
| 1,534,198 A | | 4/1925 | Wilson .................. 277/452 |
| 1,557,256 A | * | 10/1925 | La Bonsky ............. 277/453 |
| 1,586,459 A | * | 5/1926 | Norton .................. 277/460 |
| 2,340,466 A | * | 2/1944 | Gosling ................ 277/436 |
| 3,144,256 A | * | 8/1964 | Wright .................. 277/436 |
| 3,202,430 A | * | 8/1965 | Braendel ............... 277/463 |
| 3,545,775 A | | 12/1970 | Prasse |
| 3,563,442 A | * | 2/1971 | Kretchman ............. 277/438 |
| 4,858,516 A | * | 8/1989 | Klein ..................... 92/240 |
| 6,485,026 B1 | | 11/2002 | Hubert et al. |

FOREIGN PATENT DOCUMENTS

GB 992123 A1 * 5/1965

OTHER PUBLICATIONS http://www.xyd-autoparts.com/pistonring1.htm &19484664=83077557.*
http://www.thn.nl/producten.php?lang=UK&page=zuigerveren.php.*
Je Pro Seal piston rings catalogue, 2005, vol. 1, p. 8.*

* cited by examiner

*Primary Examiner*—Jack W. Lavinder
(74) *Attorney, Agent, or Firm*—Rader, Fishman & Grauer PLLC

(57) ABSTRACT

A piston ring is positioned in a groove of a piston and has an outer peripheral face. The outer peripheral face is generally tapered to an edge and includes a projection. The projection extends radially outwardly from the outer peripheral face along an upper surface of the piston ring. The projection reduces the gap between the outer peripheral face and a wall of the surrounding cylinder. The gap is typically exposed to combustion gases and the projection reduces the exposed area. Ring collapse is the separation of the outer peripheral face from the wall of the cylinder because of downward pressure forces of the combustion gases. Accordingly, the projection reduces the occurrence of ring collapse.

8 Claims, 3 Drawing Sheets

PISTON RING WITH PROJECTION

FIELD OF THE INVENTION

The present invention relates to a piston ring having generally parallel upper and lower surfaces with an outer peripheral face therebetween, and more particularly to a piston ring having an outer peripheral face including a radially extending projection to reduce a gap between the outer peripheral face of the piston ring and a surrounding cylinder wall.

BACKGROUND OF THE INVENTION

A piston reciprocates within a cylinder of an internal combustion engine and compresses fluids, such as gases, within a combustion chamber of the cylinder. These compressed fluids are then ignited to expand within the combustion chamber thereby forcing the piston away from the point of ignition and cycling the piston to its original position. Pistons typically include at least one groove for receiving a piston ring. The piston ring forms a seal with the wall of the cylinder to prevent gases from escaping from the combustion chamber.

There are traditionally two different types of piston rings, oil control rings and compression rings. Regarding compression rings, a piston assembly typically includes one or more compression rings to generate a seal between the outer surface of the piston and the wall of the cylinder. An inner peripheral face of the ring fits into the ring groove of the piston while a portion of an outer peripheral face of the compression ring contacts the wall of the cylinder. The outer peripheral face of the compression ring generates a seal in the gap between the piston and the cylinder wall to prevent high-pressure combustion gases and air from escaping the combustion chamber.

A particularly effective compression ring well-known in the art is a Napier-styled ring 10, as seen in FIG. 1. The Napier-style ring 10 includes a generally tapered outer peripheral face 12 and a lower surface 13 having a hook groove 14. The intersection between the hook groove 14 and the tapered outer peripheral face 12 define an edge 16 that contacts the wall 18 of the cylinder 20 when the ring 10 is positioned within a groove 22 of a piston 24.

To improve the seal generated by traditional piston rings 10, manufacturers have found it desirable to twist the rings 10 within the grooves 22 of the piston 24. Twisting the ring 10 results in the edge 16 of the outer peripheral face 12 of the piston ring 10 bearing against the wall 18 of the cylinder 20 with an increased force as compared to the rest of the outer peripheral face 12. This increased force on the edge 16 generates a more effective seal and prevents leakage of gases, air and lubricating oils between the cylinder wall 18 and the outer peripheral face 12 of the piston ring 10. Furthermore, twisting the ring 10 within the groove 22 eliminates passageways 26 between surfaces of the piston ring 10 and boundaries of groove 22 to provide continuity of the seal and prevent the escape of gases from the combustion chamber through the passageways 26. While manufacturers continually search for ways to increase the amount of twist of the piston ring 10 within the groove 22, a natural, inherent twist typically exists. The natural twisting results from the cycle of the piston 24 within the cylinder 20. The cycle of the piston 24, along with the contact of the edge 16 of the outer peripheral face 12 with the wall 18 of the cylinder 20, produces a minimal amount of natural twisting of the piston ring 10 within the ring groove 22.

Twisting the compression ring 10 within the groove 22 of the piston 24 is also beneficial for Napier-style compression rings 10. The edge 16 defined by the hook groove 14 will contact the wall 18 of the cylinder 20 with increased force as compared to other portions of the tapered outer peripheral face 12 to provide an effective seal. Further, elimination of the passageways between surfaces of the piston ring 10 and boundaries of the groove 22 is beneficial to prevent escape of combustion gases. However, twisting Napier-styled rings 10 has yielded other challenges for piston ring manufacturers. Specifically, twisting of Napier-styled rings 10 has increased the occurrence of a phenomenon commonly known as ring collapse.

Ideally, the edge 16 of the outer peripheral face 12 is in contact with the wall 18 of the cylinder 20 to prevent gases from escaping. However, in some instances, combustion gases enter a gap 30 disposed between the outer peripheral face 12 and the wall 18 of the cylinder 20. Forces generated by the combustion gases press downward upon the outer peripheral face 12 to separate the edge 16 from the wall 18. This separation between the edge 16 and the wall 18 permits combustion gases to escape from the combustion chamber and is commonly known as ring collapse. As a result, ring collapse reduces the effectiveness of piston rings 10.

Ring collapse is particularly prevalent with Napier-style rings 10 because of the tapered outer peripheral face 12. The taper generates a gap 30 typically larger in area than the gap 30 associated with traditional piston rings. Accordingly, a greater portion of the tapered outer peripheral face 12 is exposed to the combustion gases and more force presses downward to separate the edge 16 from the wall 18 of the cylinder 20 than with traditional piston rings. Further, although twisting the ring 10 within the groove 22 has some beneficial results, twisting also produces a larger gap 30 than gaps 30 associated with traditional, non-twisted rings.

To compensate for the detrimental effects of the ring collapse phenomenon, manufacturers attempt to eliminate or at least minimize twisting of the piston ring 10 within the ring groove 22, even the natural twisting that occurs during the cycle of the piston 24 within the cylinder 20. To minimize the natural twist, manufacturers typically add a bevel 28 between the inner peripheral face 26 and the lower surface 13, as seen in FIG. 2. However, producing the bevel 28 requires a time-consuming and costly additional machining process, thereby increasing the overall cost of the piston ring 10.

Accordingly, there is a need for an improved piston ring that provides an effective seal between an outer peripheral face of the ring and a wall of a cylinder, utilizes the positive effects of twisting the piston ring within the ring groove, but reduces the occurrence of ring collapse without additional machining processes.

BRIEF SUMMARY OF THE INVENTION

The inventors of the present invention have recognized these and other problems associated with traditional piston rings described above. To this end, the inventors have developed a piston ring having a projection on an outer peripheral face thereby reducing the size of a gap between the outer peripheral face of the piston ring and a wall of a cylinder to eliminate ring collapse.

Specifically, the invention, a piston ring, comprises a generally annular body having an outer peripheral face. The outer peripheral face is generally tapered and includes at least one projection.

DETAILED DESCRIPTION OF THE INVENTION

Figure 1:
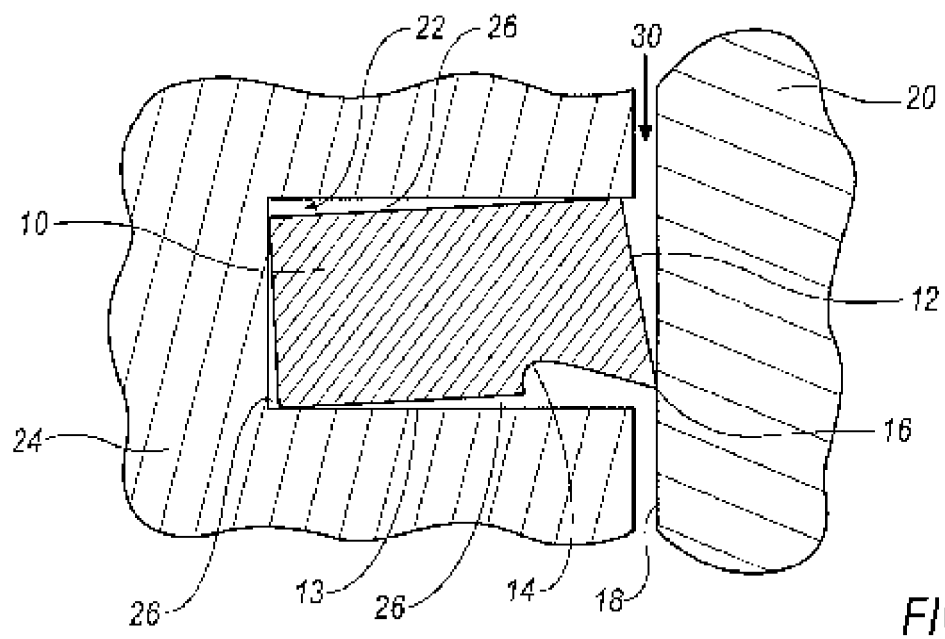
FIG. 1 is a cross-sectional view of traditional Napier-style piston ring of a type well-known in the prior art.
Figure 2:
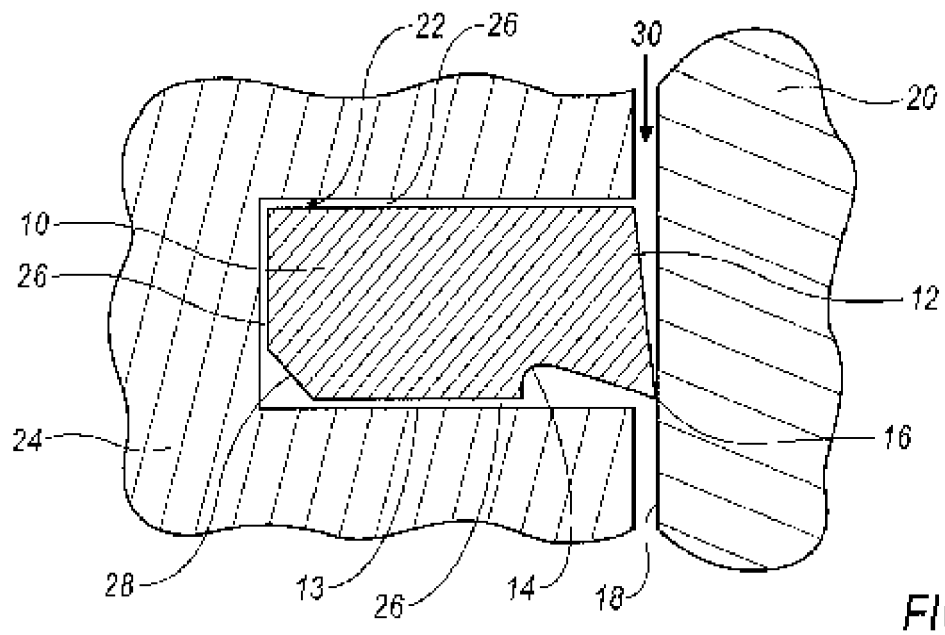
FIG. 2 is a cross-sectional view of a traditional Napier-style piston ring including a bevel.
Figure 3:
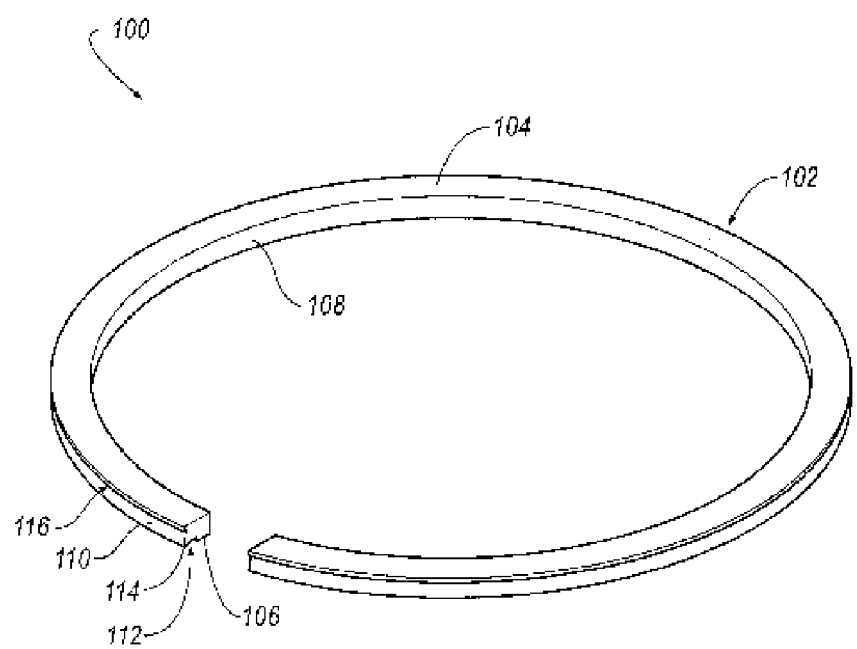
FIG. 3 is a perspective view of the piston ring according to an embodiment of the present invention.
Figure 4:
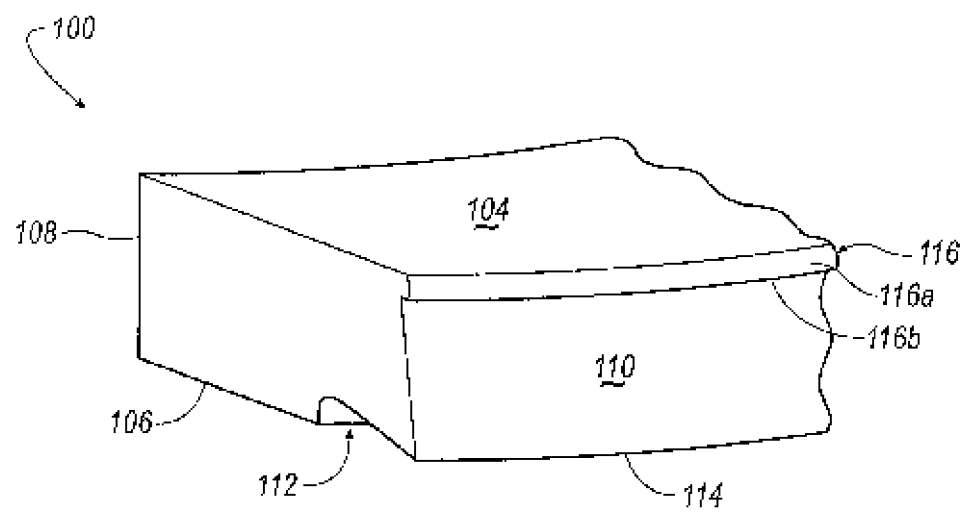
FIG. 4 is a sectional perspective view of the piston ring of the present invention.
Figure 5:
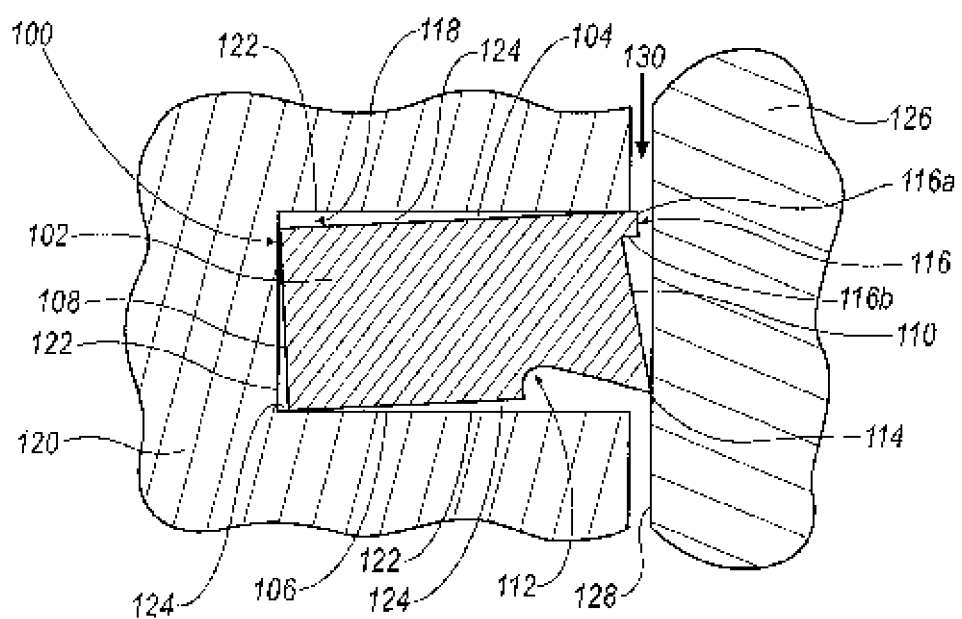
FIG. 5 is a cross-sectional view of a piston ring of the present invention when mounted in a groove of a piston.

Referring now to FIGS. 3-5, a piston ring of the present invention is shown generally at 100. The piston ring 100 includes a generally annular body 102 having an upper surface 104, a lower surface 106, an inner peripheral face 108 and an outer peripheral face 110. The upper and lower surfaces 104, 106 are generally parallel and disposed between the inner and outer peripheral faces 108, 110.

Specifically, the lower surface 106 includes a generally hook-shaped groove 112 at the outer peripheral face 110 to define an edge 114. Further, the outer peripheral face 110 is generally tapered and extends outwardly from the upper surface 104 to the edge 114. In general, the piston ring 100 is commonly referred to in the art as a Napier-style or hook-groove piston ring.

However, unlike the conventional Napier-style piston ring, the outer peripheral face 110 of the piston ring 100 of the present invention further includes a projection 116. The projection 116 preferably extends outwardly along the upper surface 104 of the piston ring 100. However, the projection 116 can extend outwardly at any desired location along the outer peripheral face 110 of the piston ring 100. As illustrated, the projection 116 is generally rectangular in cross-sectional shape. The rectangular shaped projection 116 includes an outer face 116a and defines a ledge 116b. The ledge 116b extends radially from the outer peripheral face 110. However, the projection 116 may be of any shape, such as rounded, triangular, or the like.

As illustrated in FIG. 5, the piston ring 100 is received within a ring groove 118 of a piston 120. The ring groove 118 defines a plurality of boundaries 122. A plurality of passageways 124 are defined between each boundary 122 and the inner peripheral face 108, upper surface 104 and lower surface 106 of the piston ring 110.

The piston 120 and piston ring 100 are received within a cylinder 126 having a cylinder wall 128. The cylinder wall 128 surrounds the piston 120 and piston ring 100. The edge 114 of the outer peripheral face 110 contacts the wall 128 of the cylinder 126. In the illustrated embodiment, the outer surface 116a of the rectangular projection 116 is substantially parallel with the wall 128 of the cylinder 126. Furthermore, a gap 130 is disposed between the outer peripheral face 110 and the wall 128 of the cylinder 126. The gap 130 is typically exposed to gases from the combustion chamber (not shown).

As described earlier, combustion chamber gases enter the gap 130 and press downward upon the outer peripheral face with enough force to separate the edge 114 from the wall 128 of the cylinder 126 thereby resulting in ring collapse as commonly understood to one skilled in the art. However, the projection 116 of the present invention reduces the occurrence of ring collapse. The projection 116, regardless of size, shape or specific location reduces the size of gap 130 exposed to combustion chamber gases and thereby reducing the amount of force the combustion chamber gases can exert upon the outer peripheral face 110. Accordingly, with less force applied to the outer peripheral face 110 than compared to traditional piston rings, the less likely the occurrence of ring collapse.

Furthermore, due to the reduced likelihood of occurrence of ring collapse, piston ring manufacturers may take full advantage of the benefits of twisting the piston ring 100 within the ring groove 118. Specifically, twisting the ring causes the edge 114 to contact the cylinder wall 128 with increased force to provide a more effective seal than traditional non-twisted rings. Additionally, as seen in FIG. 3, twisting the ring 100 results in upper surface 104, lower surface 106 and inner peripheral face 108 to contact the boundaries 122 of the ring groove 118 to seal the passageways 124 and prevent the escape of combustion gases through the passageways 124. Accordingly, twisting the piston ring 100 in the ring groove 118 is desired and the need to machine a bevel (as discussed in the Background) into the ring 100 can be eliminated.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

The invention claimed is:

1. A piston ring disposed in a ring groove of a piston and surrounded by a wall of a cylinder for use with a combustion chamber, the piston ring comprising:

a generally annular body having generally parallel upper and lower surfaces disposed between inner and outer peripheral faces, the outer peripheral face being generally tapered to an edge such that the edge contacts the wall of the cylinder and defining a gap between the outer peripheral face and the wall; and a projection extending radially outwardly from the outer peripheral face to reduce the gap between the outer peripheral face and the wall, the projection thereby reducing exposure of the outer peripheral face to the combustion chamber, the lower surface further including a generally hook-shaped groove and the outer peripheral face defining the edge, wherein the edge extends radially outwardly farther than the projection;

wherein the projection includes an outer surface substantially parallel to the wall of the cylinder.

2. A piston ring according to claim 1, wherein the ring groove has a plurality of boundaries.

3. A piston ring according to claim 1, wherein said projection defines a ledge extending radially from said outer peripheral face.

4. A piston ring according to claim 1, wherein the projection extends radially outwardly along the upper surface.

5. A piston ring according to claim 1, wherein the projection is generally rectangular and includes an outer surface.

6. A piston ring disposed in a ring groove of a piston and surrounded by a wall of a cylinder for use with a combustion chamber, the piston ring comprising:

a generally annular body having generally parallel upper and lower surfaces disposed between inner and outer peripheral faces, the outer peripheral face being generally tapered to an edge such that the edge contacts the wall of the cylinder and defining a gap between the outer peripheral face and the wall; and a projection extending radially outwardly from the outer peripheral face to reduce the gap between the outer peripheral face and the wall, the projection thereby reducing exposure of the outer peripheral face to the combustion chamber, the lower surface further including a generally hook-shaped groove and the outer peripheral face defining the edge, wherein the edge extends radially outwardly farther than the projection, and the projection is generally rectangular.

7. A piston ring according to claim 6, wherein an outer surface of said generally rectangular projection is substantially parallel to the wall of the surrounding cylinder.

8. A piston ring according to claim 6, wherein said rectangular projection defines a ledge extending radially from said outer peripheral face.

\* \* \* \* \*